United States Patent [19]

Shiohara

[11] Patent Number: 5,251,583
[45] Date of Patent: Oct. 12, 1993

[54] INTAKE APPARATUS FOR TWO CYCLE ENGINE

[75] Inventor: Masakazu Shiohara, Iwata, Japan

[73] Assignee: Yamaha Hatsudoki Kabushiki Kaisha, Iwata, Japan

[21] Appl. No.: 712,481

[22] Filed: Jun. 10, 1991

[30] Foreign Application Priority Data

Jun. 9, 1990 [JP] Japan .................. 2-150913
Jun. 9, 1990 [JP] Japan .................. 2-150915
Jun. 9, 1990 [JP] Japan .................. 2-150916

[51] Int. Cl.⁵ .................. F01L 7/06; F02B 33/04
[52] U.S. Cl. .................. 123/73 D; 123/190.14; 123/73 A
[58] Field of Search .......... 123/59 AD, 73 D, 190.14, 123/52 M, 73 A, 73 B, 73 C, 73 V, 73 PP

[56] References Cited

U.S. PATENT DOCUMENTS

| | | | |
|---|---|---|---|
| 4,079,706 | 3/1978 | Konig | 123/73 D |
| 4,417,559 | 11/1983 | Matsuda et al. | 123/52 M |
| 4,444,013 | 4/1984 | Inoue et al. | 123/52 M |
| 4,550,696 | 11/1985 | Ehrlich | 123/73 D |
| 4,608,949 | 9/1986 | Nakano et al. | 123/73 D |
| 4,644,911 | 2/1987 | Hidaka et al. | 123/52 M |
| 4,648,474 | 3/1987 | Shinozaki et al. | 123/52 M |
| 4,760,703 | 8/1988 | Minami et al. | 123/52 M |
| 4,905,636 | 3/1990 | Kronich | 123/73 C |

Primary Examiner—David A. Okonsky
Attorney, Agent, or Firm—Ernest A. Beutler

[57] ABSTRACT

A motorcycle powered by a two cycle internal combustion engine having an improved induction system that has a vertically extending intake pipe so as to permit a wide latitude of leaning of the motorcycle without interference from the induction system. The induction system serves the crankcase of the engine through a rotary plate type valve that has a helical connection to the engine output shaft so that the timing of the opening and closing of the intake port can be adjusted. A servo motor adjusts the helical connection under the CPU so that the timing change mechanism need not be powered directly by the engine.

21 Claims, 9 Drawing Sheets

INTAKE APPARATUS FOR TWO CYCLE ENGINE

BACKGROUND OF THE INVENTION

This invention relates to an intake apparatus for a two cycle engine and more particularly to an improved rotary valve and induction system for an engine of the two cycle type.

The advantages of two cycle crankcase compression internal combustion engines are well known. One of the main advantages of this type of engine is the simplicity of the engine. Frequently these engines are operated with nothing more than a reed type check valve into the crankcase chamber and a porting arrangement that accommodates the transfer of the charge from the crankcase chamber to the combustion chamber of the engine. However, it has been recognized that performance may be improved, in some instances, through the use of some form of valve that rotates in unison with the crankshaft and which controls the opening and closing of a port that communicates the induction system with the crankcase chamber or the combustion chamber.

A wide variety of fixed type valve mechanisms have been proposed for this purpose. However, it has been acknowledged that the performance of the engine can be improved by employing a variable valve timing for such valves. The type of variable valve timing mechanism previously incorporated have utilized a pair of blade type rotating valve plates that move relative to each other to change the timing events. These types of device both retard the point at which the port opens and advance the time at which the port closes. However, it may not always be desirable to provide such extreme changes in both directions of port operation. Furthermore, the prior art type of arrangements have employed centrifugal governors for their operation and hence absorb power from the engine in order to achieve the valve operation and the change in timing.

It is, therefore, a principal object of this invention to provide an improved porting arrangement for a two cycle engine and valve control for the port.

It is a further object of this invention to provide an improved and simplified valve port timing arrangement for the rotary valve of a two cycle engine.

It is a further object of this invention to provide a valve port timing arrangement for the rotary valve of a two cycle engine wherein the timing adjustment is made without requiring power from the engine.

One common application for two cycle engines is in motor cycles. In conjunction with motorcycle applications, if a rotary valve is employed it is the normal practice to induct the charge into the crankcase at one side of the crankcase. With the normal disposition of the engine in the motorcycle, this places the induction system at the side of the motorcycle. The disadvantage with such side placement is that the induction system may interfere with the amount at which the motorcycle can be leaned by the rider when cornering.

It is, therefore, a still further object of this invention to provide an improved induction system for a two cycle engine as employed in a motorcycle wherein the induction system does not interfere with the amount of leaning possible for the motorcycle.

It is a further object of this invention to provide an improved and simplified induction system and fuel injection system with cooperating throttle valve arrangement for a two cycle engine utilized to power a motorcycle which will be compact and yet easy to service.

SUMMARY OF THE INVENTION

A first feature of this invention is adapted to be embodied in an induction system for a two cycle internal combustion engine comprising an intake port for serving said engine to deliver an intake charge thereto. A single valve plate is rotatably journaled relative to the intake port for sequentially opening and closing the intake port. Drive means drive the valve plate in sequence with the output shaft of the engine. In accordance with this feature of the invention, the drive means include means for varying the angular relationship of the valve plate to the output shaft for adjusting the timing of the events of the intake port.

Another feature of the invention is adapted to be embodied in a motorcycle having a two cycle internal combustion engine with its output shaft rotatable about a transversely extending axis. An induction system is provided for inducting a charge into the crankcase through an inlet port that is disposed at one side of the crankcase chamber and on one side of the motorcycle. An induction system serves this port and extends from the port in a generally vertically upward direction so as to avoid interference with leaning of the motorcycle toward the side at which the induction system is positioned.

DETAILED DESCRIPTION OF THE PREFERRED EMBODIMENT OF THE INVENTION

Figure 1:
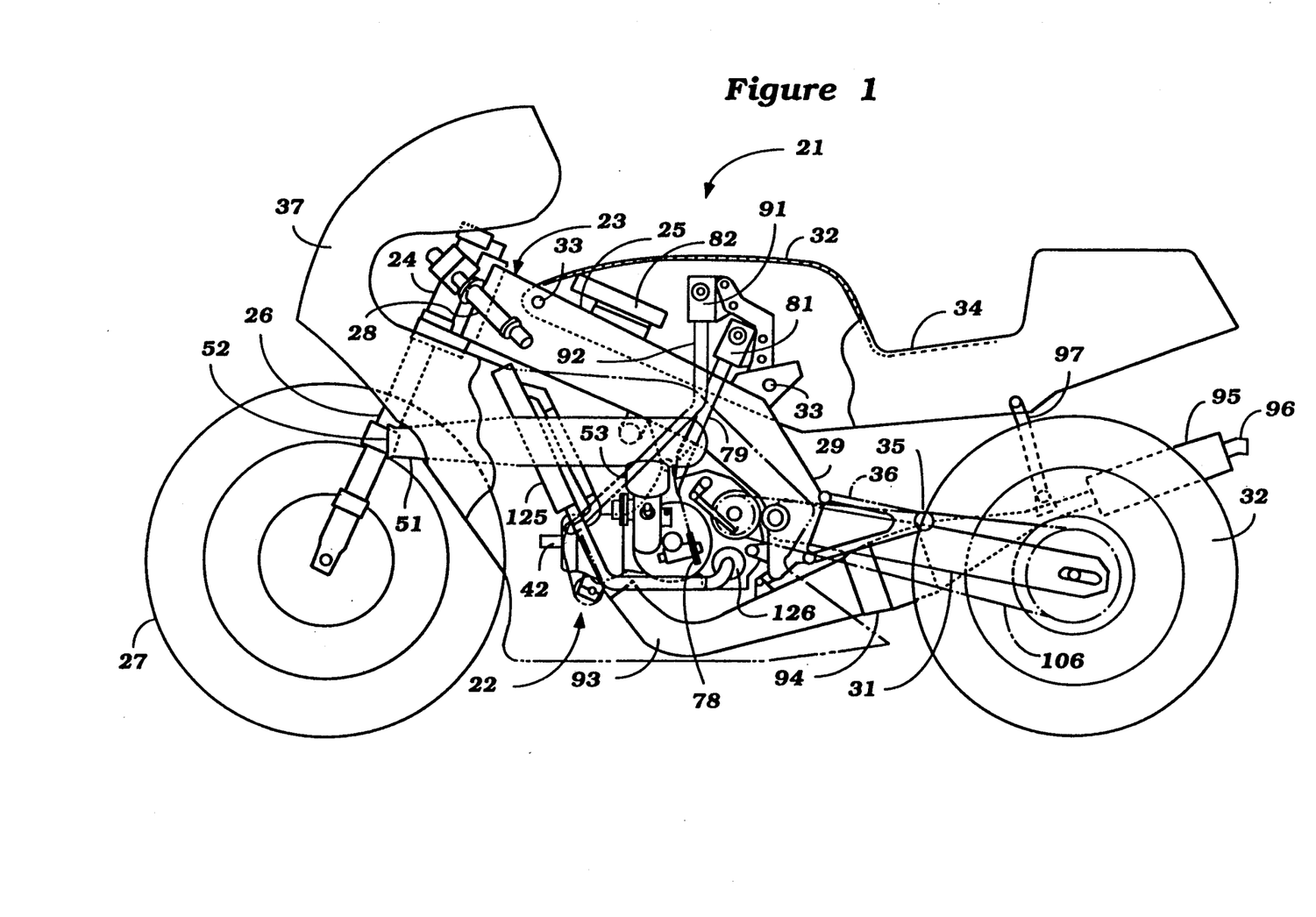
FIG. 1 is a side elevational view of a motorcycle powered by an internal combustion engine constructed in accordance with an embodiment of the invention, with portions broken away so as to more clearly show the construction.
Figure 2:
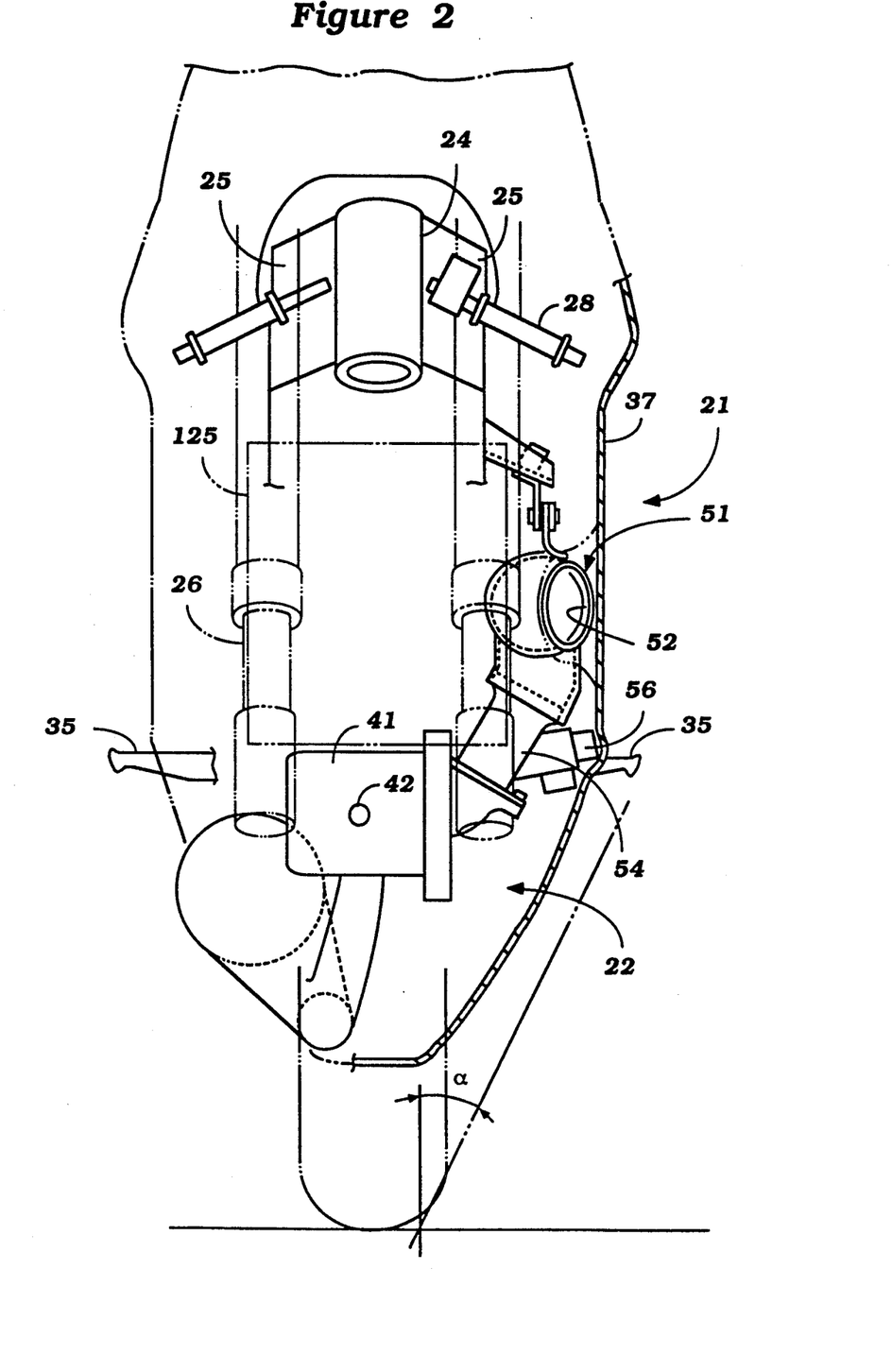
FIG. 2 is a front elevational view of the motorcycle, with portions shown in cross section and other portions shown in phantom and showing how the induction system lends itself to leaning of the motorcycle when cornering.

Referring now in detail to the drawings and initially to FIGS. 1 and 2, a motorcycle constructed in accordance with an embodiment of the invention is identified generally by the reference numeral 21. Although certain facets of the invention have particular utility in conjunction with motorcycles, the invention deals primarily with the powering internal combustion engine, indicated generally by the reference numeral 22 and specifically with the induction system for the engine 22. However, the application to a motorcycle is illustrated as this is a typical environment in which a two cycle engine of the type which will be described may be employed. Of course, the invention and certain facets of it may be employed in conjunction with other applications for engines and for other engine types than those will be specifically described.

The motorcycle 21 has a frame assembly, indicated generally by reference numeral 23, and which is a type that has a head pipe 24 and a pair of fabricated main frame members 25 that extend rearwardly and downwardly from the head pipe 24. A front fork assembly 26 is carried by the head pipe 24 for steering movement and rotatably journals a dirigible front wheel 27 in a known manner. A handlebar assembly 28 is carried at the upper end of the fork assembly 26 for steering of the front wheel 27 in a well known manner.

At the lower and rear ends of the main frame members 25 there is provided a weldment assembly 29 which provides a pivotal support for a trailing arm 31 that supports a rear wheel 32.

A combined seat and body member 32 is mounted on the frame assembly 23 in an appropriate manner, as by mounting points 33. The seat assembly 32 has a depressed portion 34 so as to accommodate a rider. A rider seated in the portion 34 may place his legs on foot pegs 35 carried by extensions 36 that are affixed appropriately to the weldment 29.

A body and cowling assembly 37 is carried forwardly and on the sides of the frame assembly 23 so as to offer streamlining and some wind protection for the rider.

Figure 3:
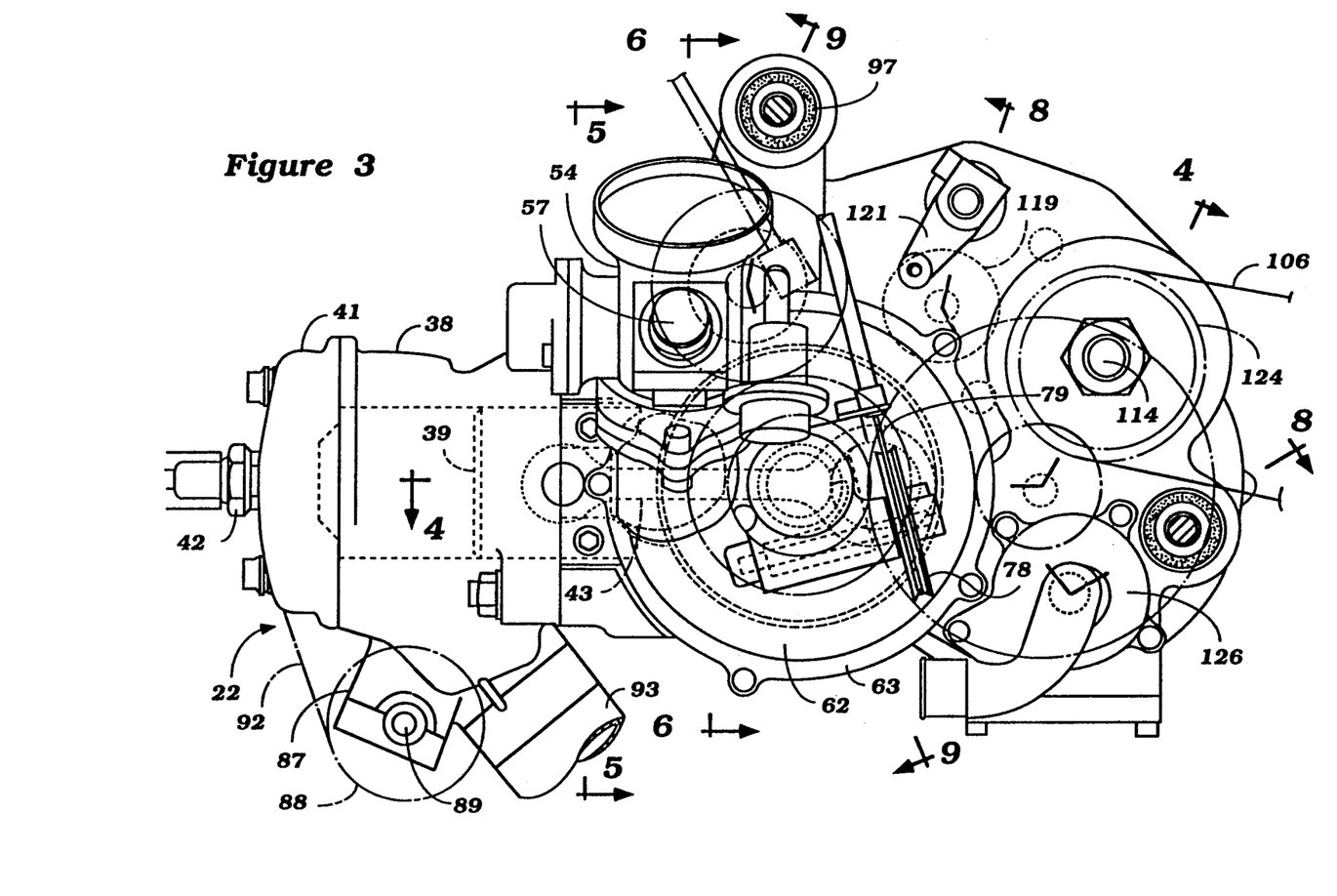
FIG. 3 is an enlarged side elevational view of the engine.
Figure 4:
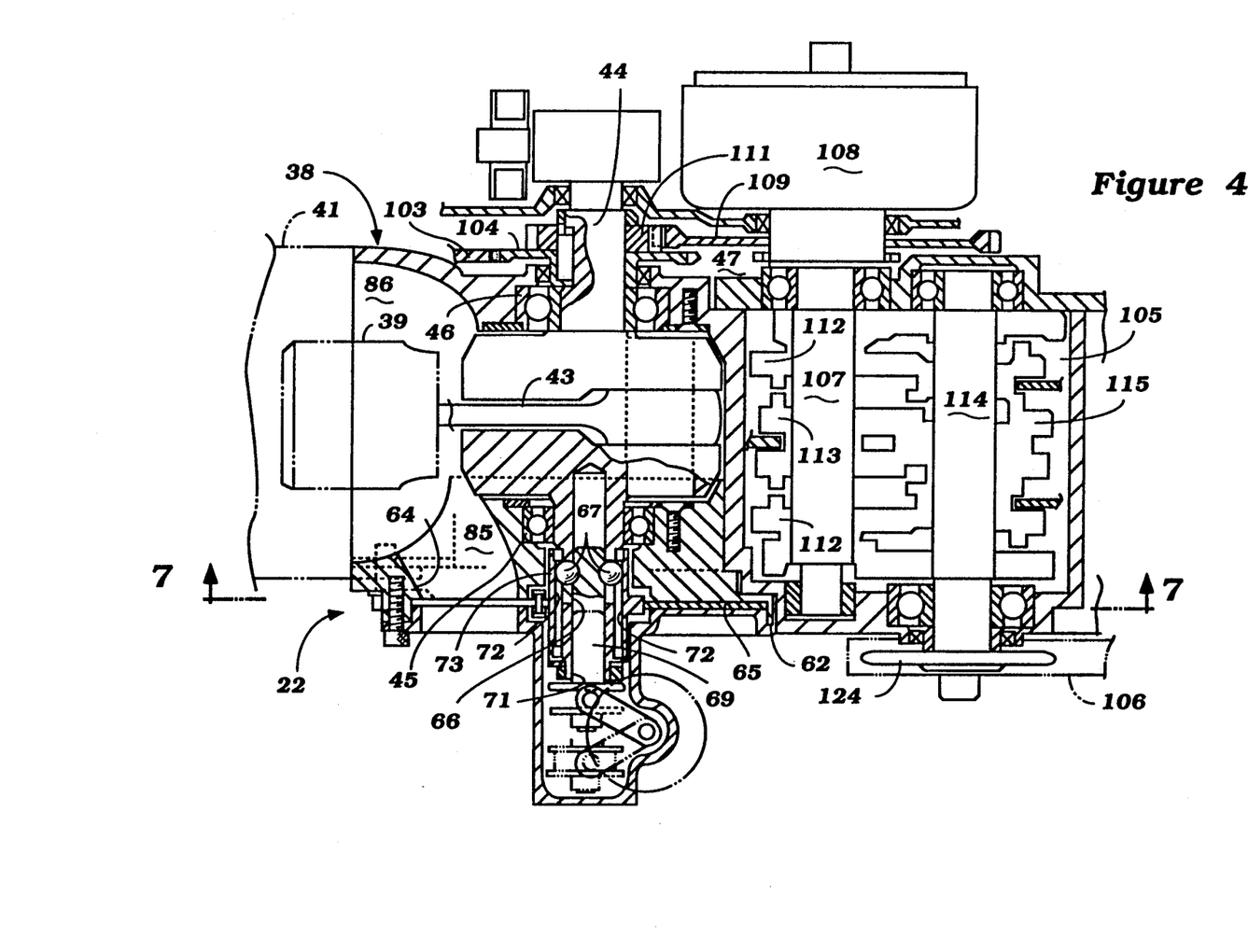
FIG. 4 is a cross-sectional view taken along the line 4—4 of FIG. 3.
Figure 9:
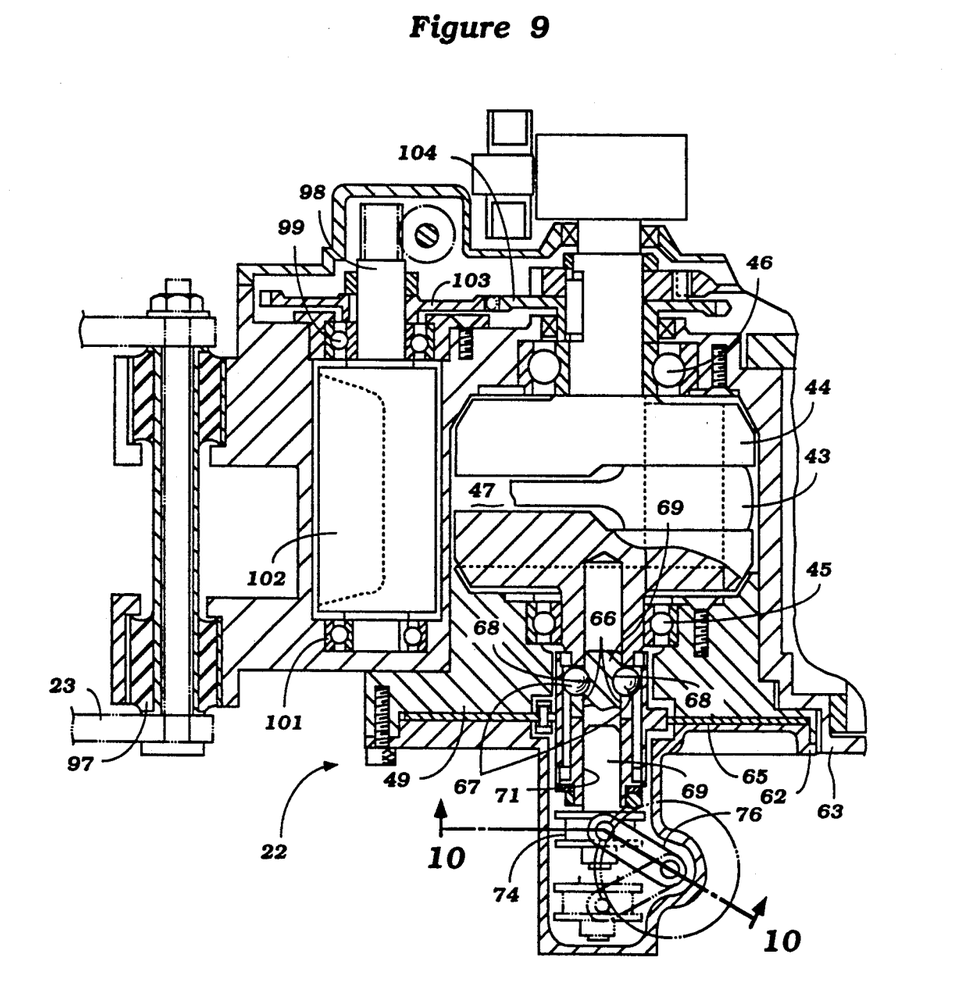
FIG. 9 is a cross-sectional view taken along the line 9—9 of FIG. 3.
Figure 10:
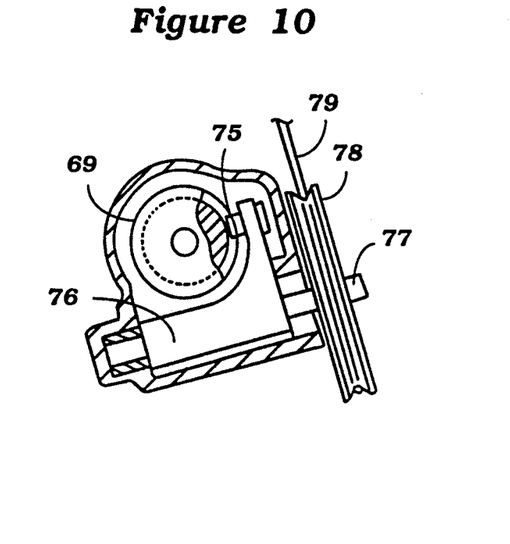
FIG. 10 is a cross-sectional view taken along the line 10—10 of FIG. 9.

Referring now in detail primarily to FIGS. 3, 4 and 9, the engine 22 is, as aforenoted, of the two cycle crankcase compression type. In the illustrated embodiment, the engine 22 is a single cylinder engine but, as will be readily apparent, the invention may be employed in conjunction with engines having other cylinder types and cylinder orientations. However, certain facets of the invention have particular utility in engines of a type that are mounted in the motorcycle 21 so that the cylinder block, indicated generally by the reference numeral 38, extends horizontally with its cylinder bore (not shown) a mounting piston 39 that reciprocates about a generally longitudinal axis. This arrangement permits a low center of gravity, as should be readily apparent. A cylinder head assembly 41 is affixed to the cylinder block 38 in a known manner and mounts a spark plug 42 that extends generally in a forward direction and which is fired by an appropriate ignition system (not shown).

The piston 39 is connection to one end of the connecting rod 43 which connecting rod has its opposite end journaled on a throw of a crankshaft, indicated generally by the reference numeral 44. The crankshaft 44 is journaled, in the illustrated embodiment, by means of a pair of anti-friction bearings 45 and 46 within a crankcase chamber 47 formed by the cylinder block 38 and a combined crankcase transmission case, indicated generally by the reference numeral 49. As is conventional with motorcycle practice, the crankshaft 44 rotates about a horizontally disposed axis which extends generally transversely across the motorcycle 21 from side to side.

The engine 22 is provided with an induction system which includes an inlet device 51 (FIGS. 1 and 2) which is generally elongated and which extends along one side of the motorcycle 21, the left side in the illustrated embodiment. The air inlet device 51 has a forwardly facing inlet opening 52 for receiving ram air and delivering it rearwardly. At the rearward end of the inlet device 51, there is provided a generally downwardly extending section 53 which is fitted onto a throttle body shown in most detail in FIGS. 5 and 6 and indicated generally by the reference numeral 54. The throttle body 54 rotatably journals a throttle valve 55 upon a throttle valve shaft 56. The throttle valve shaft 56 extends in a generally horizontal direction.

Figure 6:
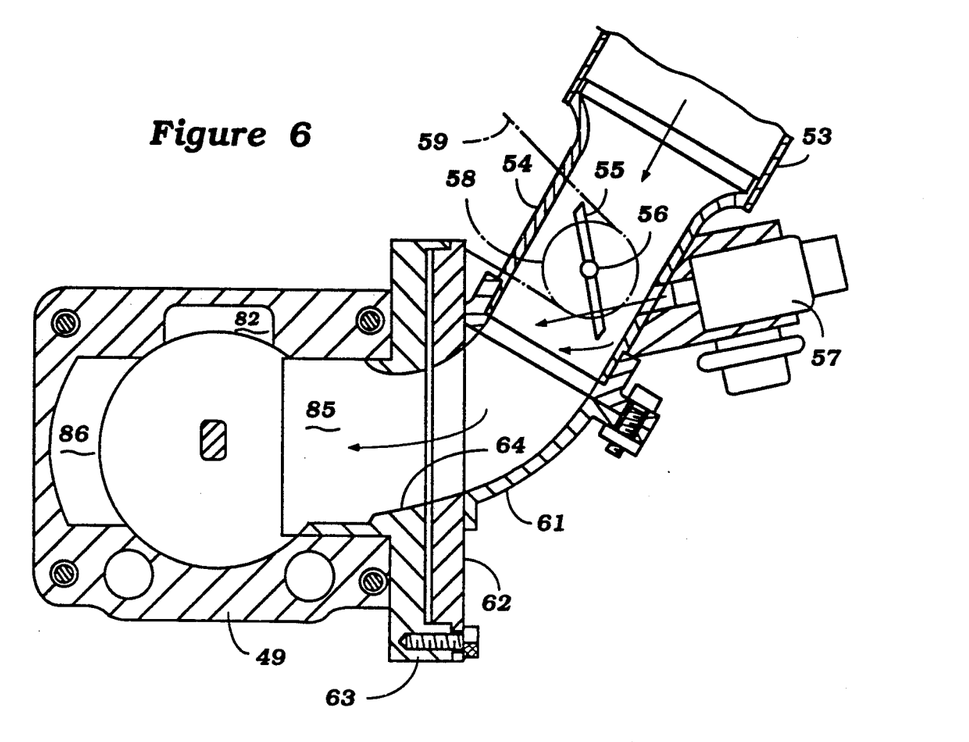
FIG. 6 is a cross-sectional view taken along the line 6—6 of FIG. 3.

A fuel injector, indicated by the reference numeral 57, is mounted in the throttle body 54 and sprays in a generally horizontal direction to the path of air flow as shown best in FIG. 6. This will insure good mixing. Also, it should be noted that the throttle body 54 and inlet device portion 53 extend in a generally vertical direction so as to form a downdraft type of induction system. As may be best seen in FIG. 2, this arrangement is such that the induction system will be spaced inwardly within the body 37 and not offer any significant interference to the leaning of the motorcycle through an angle α as shown in FIG. 2. Thus, unlike prior art constructions embodying horizontally disposed induction systems, the arrangement provides a very compact assembly without offering any flow resistance and, at the same time, providing good induction efficiency and the ability to lean, as aforenoted.

Figure 5:
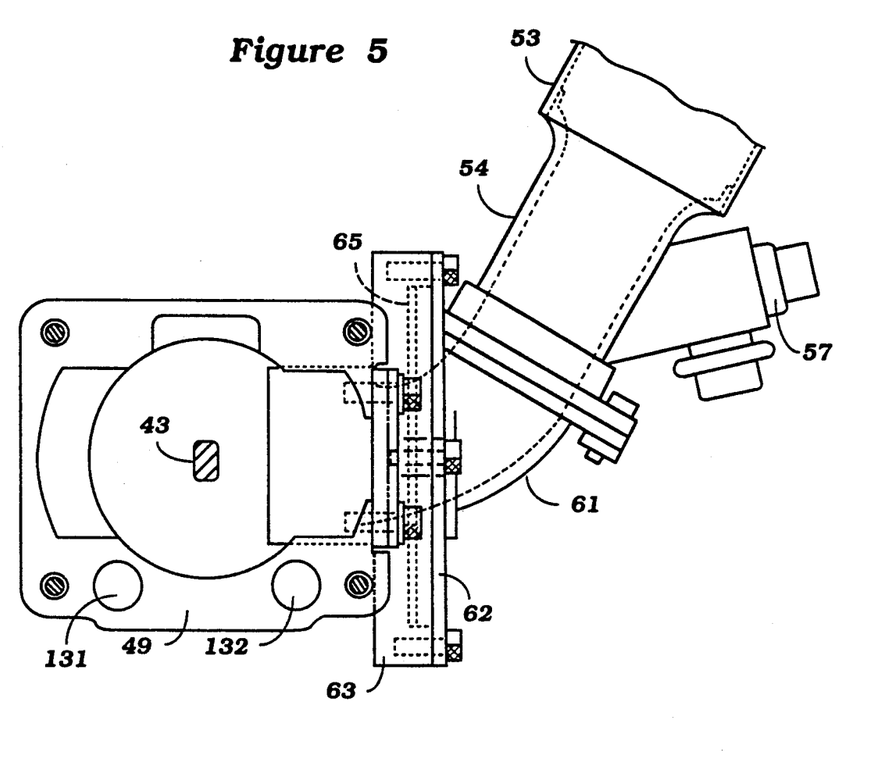
FIG. 5 is a cross-sectional view taken along the line 5—5 of FIG. 3.

The throttle valve shaft 56 has affixed to an exposed outer end a throttle drum 58 that is connected by means of a wire actuator 59 to a throttle grip (not shown) for controlling the speed of the engine in a known manner.

Figure 7:
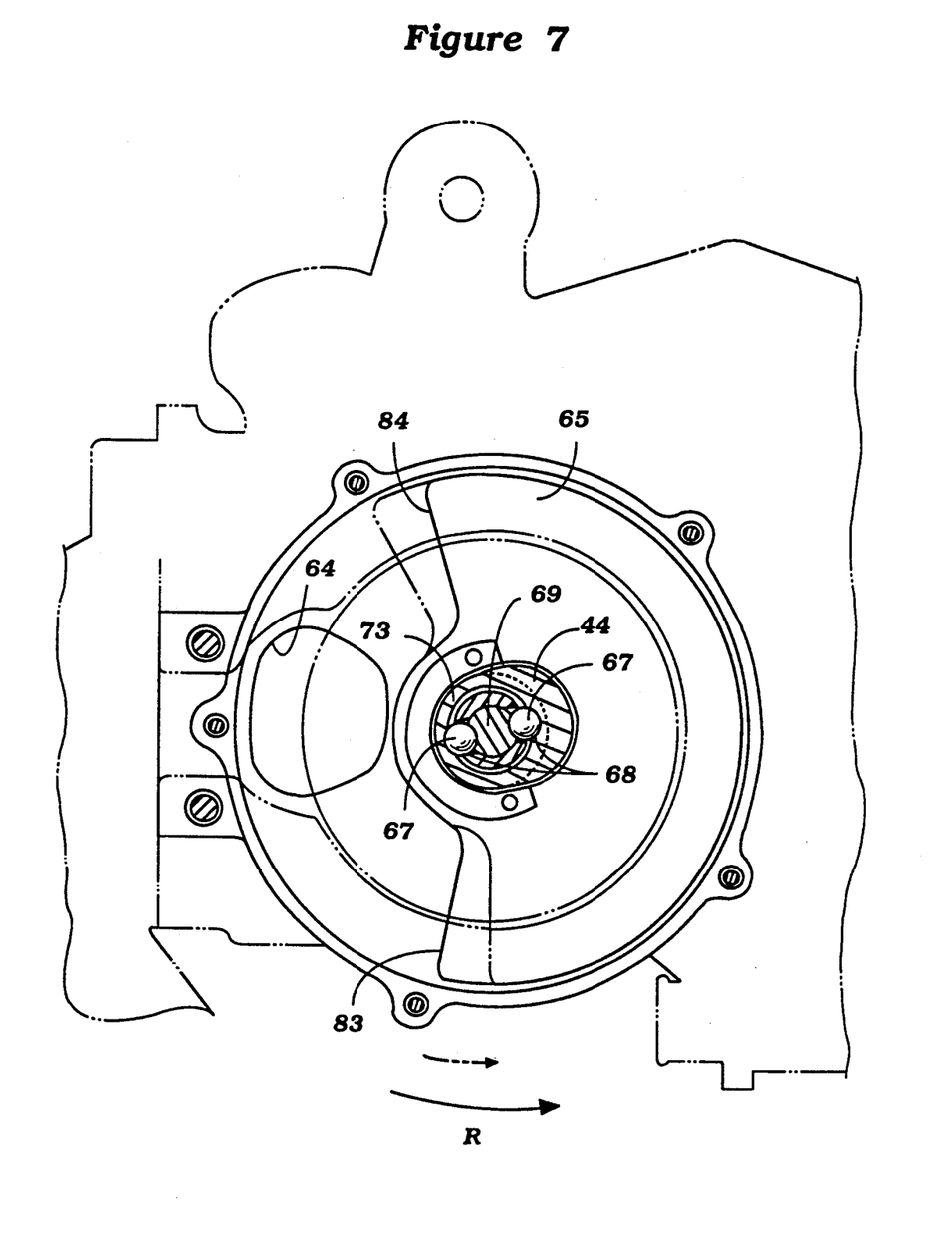
FIG. 7 is a cross-sectional view taken along the line 7—7 of FIG. 4.

The throttle body 54 communicates with an elbow pipe 61 having a flange 62 that is connected to a rotary valve housing 63 which is, in turn, affixed in a suitable manner to the side of the crankcase 49. As may be seen in FIG. 7, the housing 63 and crankcase member 49 define an air inlet port 64 having a cross-sectional configuration as best seen in FIG. 7. A rotary valve element 65 is affixed to the crankshaft 44, in a manner to be described, and controls the opening and closing of the air inlet port 64 and, accordingly, the communication of the intake system thus far described with the crankcase chamber 47 of the engine. By use of the rotary valve 65 rather than the conventionally used type of reed type valves for precluding reverse flow, a better induction efficiency can be achieved and the timing of opening and closing of the port 64 can be more accurately controlled. In addition, the connection of the valve 65 to the crankshaft 44 is such so as to permit the timing events to be adjusted so as to suit engine performance and engine running conditions.

Referring now primarily to FIGS. 4, 7 and 9, it will be seen that the crankshaft 44 has a pair of elongated slots 66 in which balls 67 are positioned. The balls 67 are, in turn, received within detent recesses 68 formed in a plunger 69 that is slidably supported within a bore 71 formed in the inlet side of the crankshaft 44. The balls 68 also are received within slots 72 formed in a hub 73 of the rotary valve 65. Either or both of the slots 66 or 72 are helically configured so that if the plunger 69 is moved axially within the crankshaft 44, in a manner as will be described, the phase angle between the valve 65 and the crankshaft 44 will be altered.

The outer end of the plunger 69 is formed with a grooved portion 74 to receive a follower pin 75 of a cam actuator lever 76. The actuator lever 76 is rotatably journaled within a boss formed in the flange 62 and is affixed to a shaft 77 to which an actuating pulley 78 is affixed. A wire actuator 79 connects this pulley 78 to a servo motor 81 (FIG. 2) that is positioned beneath the seat 32 and which is controlled by an ECU 82. As the pulley 78 and follower arm 76 are rotated from one position as shown in solid line views in FIGS. 4 and 9 to the phantom line view position, the cooperation of the balls 68 in the helical slots 66 and/or 72 will cause the phase angle of the plate valve 65 to change from the solid line view shown in FIG. 7 to the phantom line view shown in this figure. As a result in this angular change, the intake port 64 will be opened at an earlier point, assuming a counterclockwise direction of rotation as seen in FIG. 7 where the direction of rotation is indicated by the arrow R, and to be closed at an earlier point. In this way, the time of opening and closing of the intake port 64 can easily be changed since the leading and trailing edges 83 and 84 of the valve 65 will open and close the port 64 at different angular relationships. Thus, a greater degree of overlap can be achieved when operating at high speeds and high loads than when low speeds and low loads and engine performance can be improved. Also, since the servo motor 81 is utilized to operate the valve 65, no power of the engine will be consumed by this operation.

As may be seen in FIGS. 5 and 6, the port 64 leads into a first scavenge passage 85 and additional scavenge passages 86 and 87 communicate the crankcase chamber with the area above the piston as is conventional with two cycle practice for transferring the charge from the crankcase chamber 47 to the combustion chamber for firing by the spark plug aforenoted.

The burned charge is discharged through an exhaust port (not shown) in which an exhaust control valve is positioned. This exhaust control valve is contained within an exhaust control valve housing 87 and operates to control the opening and closing of the exhaust port relative to the motion of the piston 39, as is well known. A pulley 88 is affixed to the shaft 89 of this exhaust control valve and is operated by a further servo motor 91 positioned beneath the seat 32 and actuated by means of wire actuators 92. As a result, the timing of both the intake and exhaust ports can be tuned by a suitable control circuitry and strategy so as to optimize engine performance.

The exhaust gases which exit past the exhaust control valve, as thus far described, pass into an exhaust pipe 93 that extends from the cylinder block 38 downwardly and then rearwardly to join into an expansion chamber 94 and eventually a muffler 95 for discharge to the atmosphere through a tail pipe 96. An exhaust hanger 97 suspends the exhaust system thus far described from the frame 23 in a known manner.

The engine 22 is mounted within the frame assembly 23 in any suitable manner and one of the supports is provided by a boss assembly that receives an elastomeric support 97 (FIGS. 7 and 9) for carrying the engine in the frame 23.

The engine is also provided with a balancer shaft 98 that is journaled within the crankcase 49 by means of a pair of spaced apart bearings 99 and 101 and which carries an eccentric mass 102 for balancing the engine. This eccentric mass 102 is driven at crankshaft speed by means of a gear 103 affixed to the shaft 98 and a gear 104 affixed suitably to the crankshaft 44.

Figure 8:
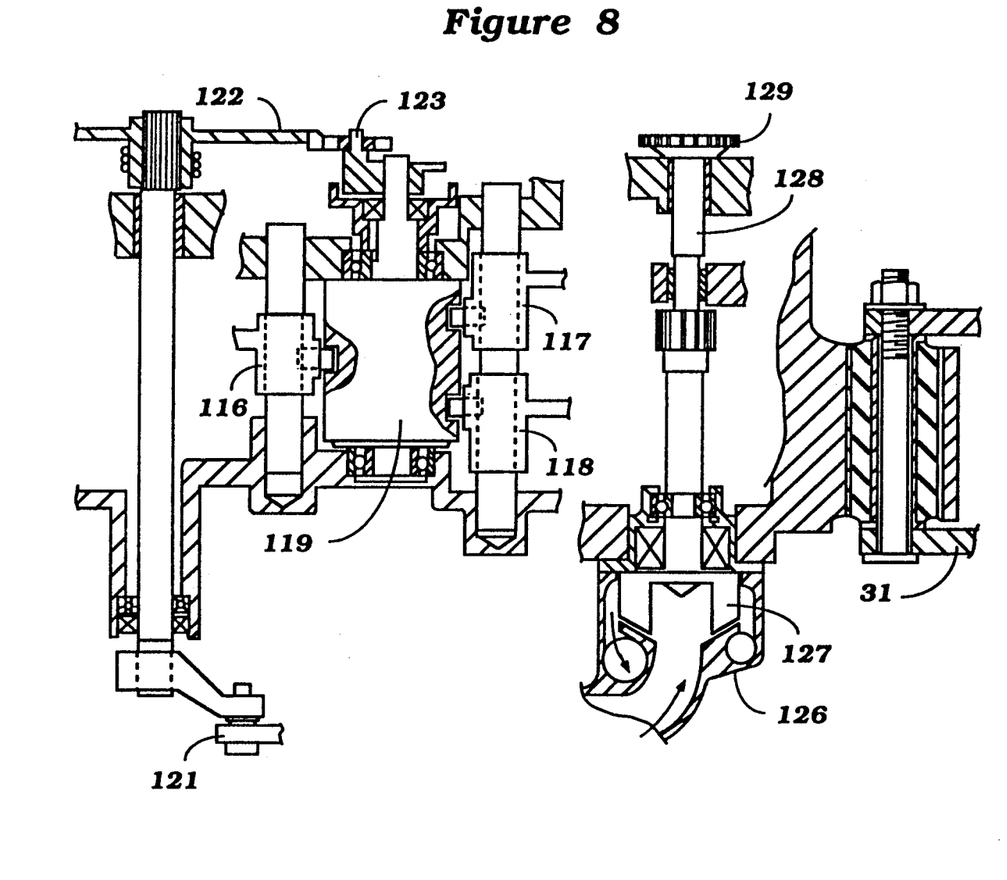
FIG. 8 is a cross-sectional view taken along the line 8—8 of FIG. 3.

As is typical with motorcycle practice, a change speed transmission, shown in most detail in FIGS. 4 and 8 and identified by the reference numeral 105, is driven by the engine crankshaft 44 for driving the rear wheel 32 through a drive chain 106 (FIG. 1). This change speed transmission 105 includes a primary shaft 107 that is driven from the crankshaft 44 by a clutch 108. The driven disc of the clutch 108 is affixed for rotation with a gear 109 which meshes with a gear 111 that is fixed to the crankshaft 44 adjacent the gear 104. A plurality of gears 112 are journaled for rotation on the primary shaft 107 and can be clutched into engagement with the shaft through a dog clutching arrangement 113. The primary gears 112 are intermeshed with driven gears carried on a secondary transmission 114 and which are coupled to this shaft by means of a dog clutching sleeve 115. The dog clutching sleeves 114 and 115 are operated by means of shift forks 116, 117 and 118 by means of a shift drum 119 that is rotatably journaled within the transmission in a known manner. A shift pedal 121 is connected to the shifting drum 119 by means of a cam ring 122 and follower 123 for rotating the drum 119 and selecting the desired speed ratio for the secondary shaft 114.

The exposed end of the secondary shaft 114 carries a drive sprocket 124 that drives the chain 106.

In the illustrated embodiment, the engine 22 is water cooled and to that end a cooling radiator 125 (FIG. 1) is carried by the frame assembly 23. Coolant is circulated through the radiator 124 and cooling jacket of the engine 22 by a coolant pump 126 mounted to the rear of the transmission and which appears best in FIG. 8. This water pump 126 includes an impeller 127 that is fixed to a shaft 128 which is suitably driven from the crankshaft 44 and which has a drive gear 129 for this purpose.

Portions of the engine cooling jacket appear in FIG. 5 wherein the water conduits therefor are indicated by the reference numerals 131 and 132.

From the foregoing description it should be readily apparent that the induction system for the engine permits the engine to be employed easily in a motorcycle that can be leaned to a large extent for cornering without interference from the induction system due to its updraft nature. Also, the fuel injector for the induction system is positioned in such a way that it can inject almost at a cross flow to the air flow through the induction passage so as to improve fuel atomization. In addition, a rotary valve is provided for controlling the opening and closing of the intake port and, accordingly, permitting a power increase while at the same time affording adjustment of valve timing in a simple manner and through the power of a servo motor rather than extracting power from the driving engine. Of course, the foregoing description is that of a preferred embodiment of the invention and various changes and modifications may be made without departing from the spirit and scope of the invention, as defined by the appended claims.

I claim:

1. An induction system of a two cycle, crankcase compression internal combustion engine comprising a crankcase chamber, an intake port in a vertically extending wall of said crankcase chamber for serving said engine to deliver an intake charge thereto, a single valve plate rotatably journaled relative to said intake port, drive means for driving said valve plate in sequence with the output shaft of said engine, said drive means including mans for varying the angular relationship of said valve plate to said output shaft for adjusting the timing of the events of the intake port, and a vertically extending intake pipe extending upwardly along said vertically extending wall of said crankcase chamber for serving said intake port.

2. An induction system for a two cycle internal combustion engine as set forth in claim 1 wherein the valve plate is coaxial with the output shaft.

3. An induction system for a two cycle internal combustion engine as set forth in claim 2 wherein the valve plate is coupled to the output shaft by a helical driving connection for achieving the variation in angular relationship by rotating the helical connection.

4. An induction system for a two cycle internal combustion engine as set forth in claim 3 wherein the helical connection includes a plunger member slidably supported within the output shaft and carrying a pair of detent balls.

5. An induction system for a two cycle internal combustion engine as set forth in claim 4 further including power means other than the engine for operating the plunger.

6. An induction system for a two cycle internal combustion engine as set forth in claim 1 further including power means independent of the engine for adjusting the angular relationship of the valve plate to the engine output shaft.

7. An induction system for a two cycle internal combustion engine as set forth in claim 6 further including a CPU for operating the power means to provide variations in valve timing in response engine characteristics.

8. An induction system for a two cycle internal combustion engine as set forth in claim 1 in combination with a motorcycle powered by the engine and wherein the output shaft of the engine is transversely disposed to the longitudinal center line of the motorcycle.

9. An induction system for a two cycle internal combustion engine as set forth in claim 8 wherein the valve port is formed in a side of the engine.

10. An induction system for a two cycle internal combustion engine as set forth in claim 9 including a horizontally disposed fuel injector for injecting fuel into the intake pipe.

11. An induction system for a two cycle internal combustion engine as set forth in claim 10 wherein there is a throttle valve in the intake pipe rotatable about a horizontally disposed axis and adjacent the fuel injector.

12. An induction system for a two cycle internal combustion engine as set forth in claim 11 wherein the valve plate is coaxial with the output shaft.

13. An induction system for a two cycle internal combustion engine as set forth in claim 12 wherein the valve plate is coupled to the output shaft by a helical driving connection for achieving the variation in angular relationship by rotating the helical connection.

14. An induction system for a two cycle internal combustion engine as set forth in claim 13 wherein the helical connection includes a plunger member slidably supported within the output shaft and carrying a pair of detent balls.

15. An induction system for a two cycle internal combustion engine as set forth in claim 14 further including power means other than the engine for operating the plunger.

16. An induction system for a two cycle internal combustion engine as set forth in claim 15 further including power means independent of the engine for adjusting the angular relationship of the valve plate to the engine output shaft.

17. An induction system for a two cycle internal combustion engine as set forth in claim 16 further including a CPU for operating the power means to provide variations in valve timing in response engine characteristics.

18. An induction system for a two cycle internal combustion engine comprising an intake port for serving said engine to deliver an intake charge thereto, a single valve plate rotatably journaled relative to said intake port coaxial to the engine output shaft for sequentially opening and closing said intake port, and drive means for driving said valve plate in sequence with said output shaft, said drive means including a helical driving connection with said output shaft for varying the angular relationship of said valve plate to said output shaft for adjusting the timing of the events of the intake port, said helical connection including a plunger member slidably supported within said output shaft and carrying a pair of detent balls.

19. An induction system for a two cycle internal combustion engine as set forth in claim 18 further including power means other than the engine for operating the plunger.

20. An induction system for a two cycle internal combustion engine as set forth in claim 19 further including a CPU for operating the power means to provide variations in valve timing in response engine characteristics.

21. An induction system for a two cycle internal combustion engine comprising an intake port for serving said engine to deliver an intake charge thereto, a single valve plate rotatably journaled relative to said intake port for sequentially opening and closing said intake port, and drive means for driving said valve plate in sequence with the output shaft of said engine, said drive means including means for varying the angular relationship of said valve plate to said output shaft for adjusting the timing of the events of the intake port including power means independent of said engine and a CPU for operating said power means to provide variations in valve timing in response engine characteristics.

* * * * *